Dec. 29, 1953 J. H. BOOTH 2,664,297
WHEEL CAMBER AND CASTER ADJUSTING MECHANISM
Filed Oct. 30, 1948 3 Sheets-Sheet 3
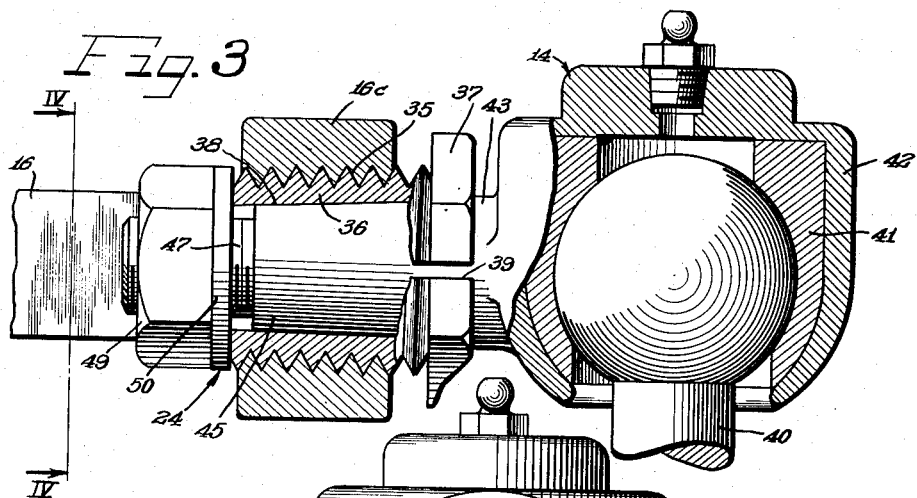
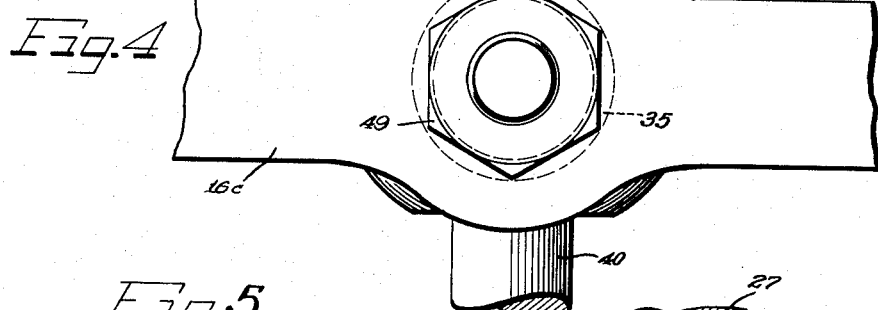
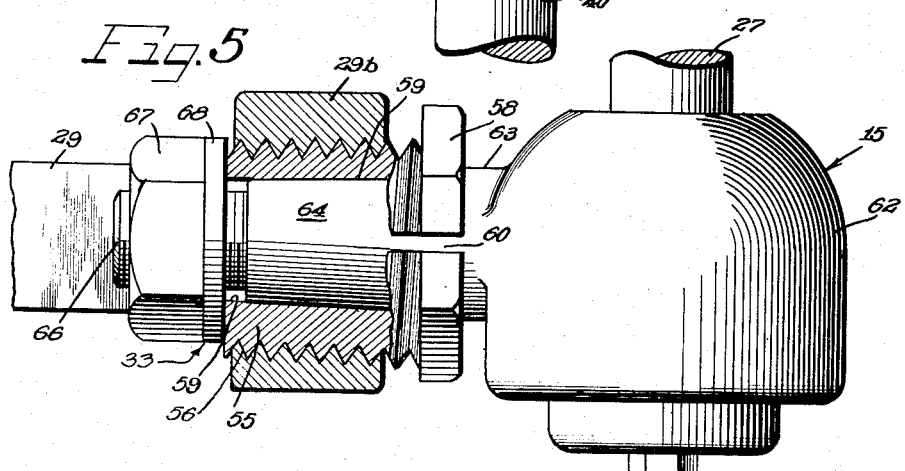
Inventor
James H. Booth Patented Dec. 29, 1953

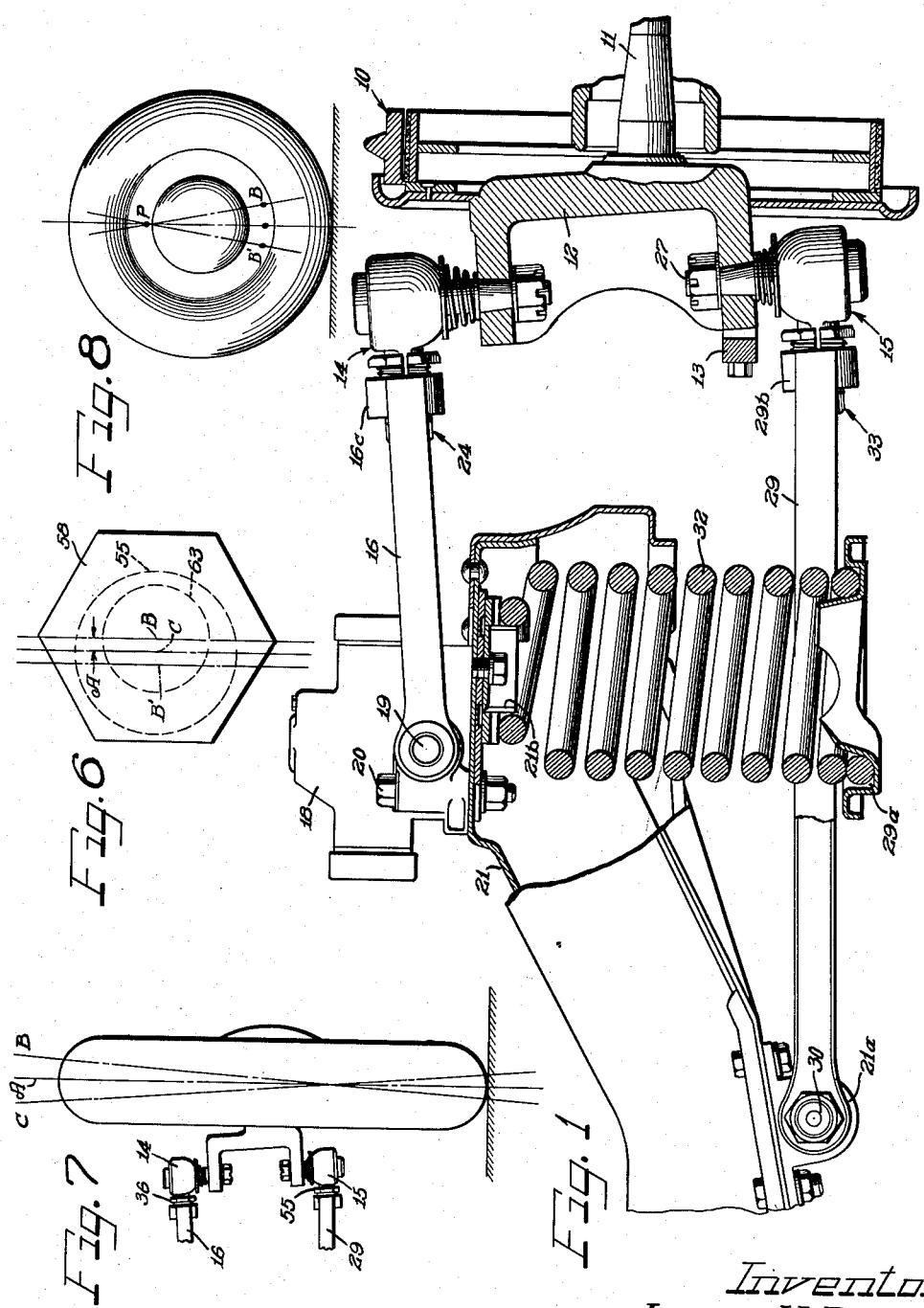

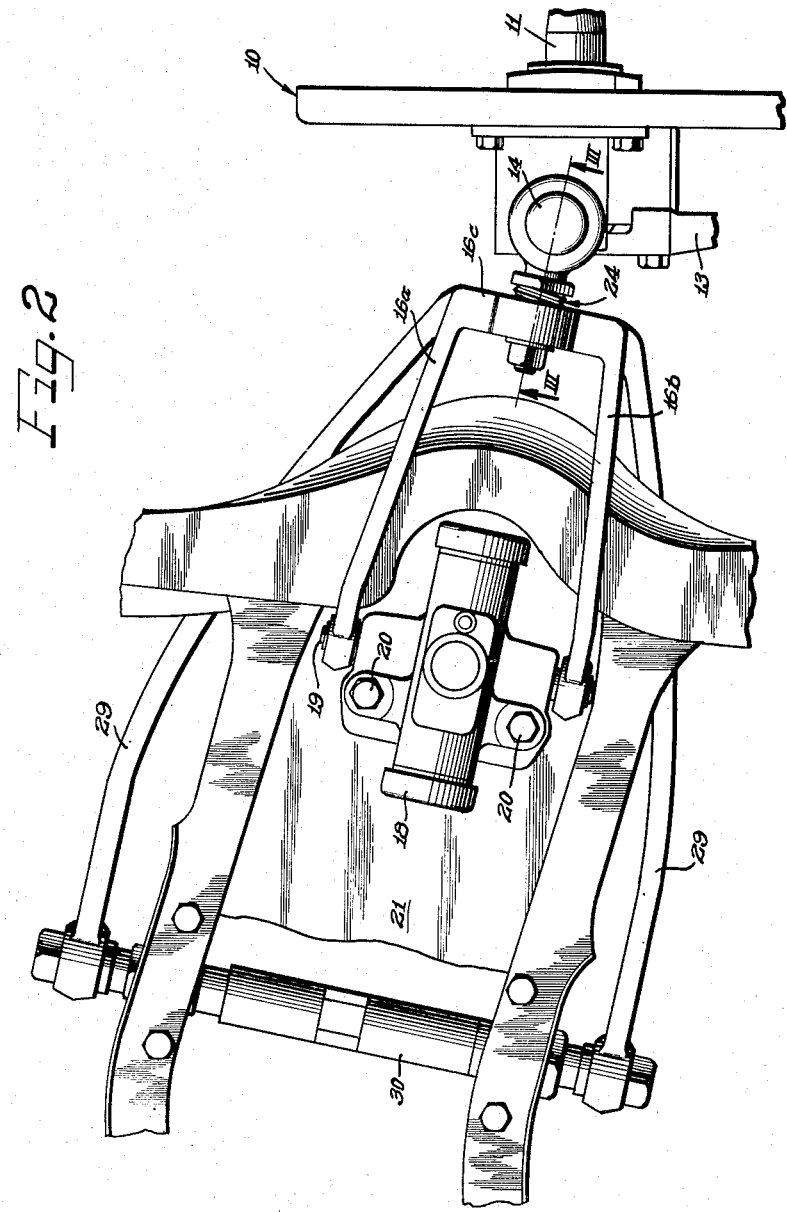

2,664,297

UNITED STATES PATENT OFFICE 2,664,297

WHEEL CAMBER AND CASTER ADJUSTING MECHANISM

James H. Booth, Venice, Mich., assignor to Thompson Products, Inc., Cleveland, Ohio, a corporation of Ohio Application October 30, 1948, Serial No. 57,440

4 Claims. (Cl. 280—96.2)

This invention relates to an adjuster mechanism and more particularly to a mechanical adjustment device for locking two levers or the like in fixed spaced relation by means of a split sleeve threaded into one member and disposed in adjustable clamping relation around the tapered shank of a second member.

The adjuster mechanism of the present invention is particularly adaptable for use in connection with linkages of an independent front wheel suspension system of an automobile. Therefore, in the accompanying drawings and in the following specification, this novel mechanism will be disclosed as employed in such a system. It is to be understood, however, that the invention should not be construed as being limited to such an installation since it is of general usefulness wherever two levers or links or the like must be adjustably secured in spaced relation.

As is well known in the automotive field, the front steering road wheels of an automobile are inclined downwardly and inwardly at an angle from the vertical. This angle is known as the camber angle. In addition, the vertical steering axis is also tilted toward the rear to give the wheels a trailing effect for causing the automobile to steer a straight course. This angle is known as the caster angle.

When the wheel suspension system is originally assembled, the mechanism is installed at the correct camber and caster angles. However, due to wear, collisions or running into curbing or the like, the wheel suspension system is often jarred out of alignment.

In a typical independent wheel suspension system, each wheel is mounted on a spindle secured to a steering knuckle which is disposed in an upright position with its upper and lower ends pivotally connected by swivel joints to the outer ends of upper and lower control arms respectively. These control arms are pivotally mounted at their inner ends to the frame structure of the vehicle.

The camber angle of a wheel mounted in such an independent suspension system may be adjusted by pivoting either the top or the bottom of the wheel laterally of the vehicle on either the lower or upper swivel joint. Similarly, the caster angle may be adjusted by pivoting the wheel longitudinally of the vehicle on either of the upper or lower swivel joint. The adjuster mechanism of this invention however is especially useful in installations where the control arms are joined directly to the steering knuckle through ball joints and lateral shifting of the lower ball joint effects camber adjustments while longitudinal shifting of the upper ball joint effects caster adjustments.

In accordance with the teachings of the present invention, camber adjustments are quickly and easily made by means of a tapered arm integrally formed on the housing of the upper ball joint. This tapered arm is arranged for wedging engagement in a tapered aperture of an externally threaded split sleeve which is threaded into the outer end of the upper control arm. Since the tapered arm of the joint housing always seats at the same position in the sleeve, the effective length of the upper control arm may be increased or decreased by threading the sleeve out of or into the control arm. Changes in the effective length of the upper control arm will, of course, vary the camber angle due to the pivoting effect of the lower ball joint.

Caster adjustments are made by means of a tapered arm formed on the housing of the lower ball joint. An externally threaded sleeve, having an eccentric tapered bore receiving said tapered arm, is adjustably threaded into the outer end portion of the lower control arm. Since the sleeve is disposed substantially laterally of the vehicle, rotation of the sleeve will cause the tapered arm and the associated lower ball joint to be shifted longitudinally relative to the control arm and to the vehicle due to the eccentric position of the tapered arm in the sleeve. Longitudinal movement of the lower ball joint will result in the steering knuckle being pivoted about the upper ball joint and thus effect adjustments of the caster angle of the wheel.

It is therefore an important object of the present invention to provide a novel means for adjusting the distance between two levers or the like.

Another object of the present invention is to provide a novel means for locking the two members in spaced, adjusted position.

A further object of the present invention is to provide apparatus for quickly and accurately adjusting the camber and caster angles of an independent wheel suspension.

A still further object of this invention is to provide a wheel suspension having adjustable ball joints connecting the steering knuckle and the control arms and having means arranged to pivot the axis of the steering knuckle on the ball joints to selectively vary the camber and caster angles of the wheels.

Other and further features, objects and advantages of the present invention will be apparent to one skilled in the art from the following detailed description taken in conjunction with the accompanying drawings.

On the drawings:

Figure 1 is a fragmentary rear end elevational view with parts in vertical cross section and with other parts broken away, of the adjustable dirigible wheel suspension apparatus of this invention;

Figure 2 is a fragmentary top plan view of the adjustable wheel suspension apparatus of this invention;

Figure 3 is a vertical sectional view, with parts in elevation, taken on line III—III of Figure 2;

Figure 4 is a vertical sectional view taken on line IV—IV of Figure 3;

Figure 5 is a fragmentary vertical sectional view, with parts in elevation, taken through the lower ball joint and adjuster assembly of the present invention;

Figure 6 is a diagrammatic sketch of a portion of the adjustment mechanism of the wheel suspension device of the present invention, showing particularly the eccentricity of the members employed in making caster adjustments;

Figure 7 is a diagrammatic sketch showing the camber adjustment according to the teachings of this invention; and Figure 8 is a diagrammatic showing of the adjustment for caster angle.

As shown on the drawings:

In Figure 1 a right front wheel suspension arrangement for an automobile is shown, as viewed from the rear of the car. It will, of course, be recognized that the complete system includes an identical suspension device, oppositely disposed, at the left side of the vehicle. The novel adjustable ball joints of the present invention may be mounted on the wheel suspension at both sides of the vehicle, since the camber and caster angles of each steering wheel must be adjusted.

Reference numeral 10 designates the brake drum of a typical road wheel rotatably mounted in the conventional manner on the wheel spindle 11. The spindle 11 is preferably formed integrally with a steering knuckle 12, which is supported for swinging, steering movement at its upper and lower ends on ball joints 14 and 15, respectively. Steering movement of the steering knuckle 12 is accomplished through a rearwardly extending steering arm 13 which is controlled from the driver's seat through the conventional tie rod and drag links.

The upper ball joint 14 is arranged to permit swinging of the knuckle 12 and at the same time is adapted to accommodate pivoting in a substantially vertical plane of an upper control arm 16. The control arm 16, as seen in Figure 2, comprises a U-shaped member having leg portions 16a and 16b straddling a shock absorber 18, being pivotally attached to opposite ends of the operating shaft 19 of the shock absorber. A plurality of bolts 20 secure the shock absorber to a cross frame member 21 of the vehicle.

As best seen in Figures 1, 2 and 3, the cross part or bight 16c of the U-shaped control arm 16 has an aperture therethrough at its central portion receiving an adjustment assembly 24 which, as will be explained hereinafter, is arranged for varying the effective length of the control arm 16 for the purpose of making camber adjustments.

The lower ball joint 15 is arranged to accommodate the swinging, steering movement of a stud 27 which has a tapered portion wedged in a hole in the bottom of the knuckle 12 by a nut threaded on the end of the stud. The joint 15 also permits pivoting in a substantially vertical plane of a lower control arm 29 which straddles, at its inner end, a downwardly extending portion 21a of the frame member 21, being connected at either end of the portion 21a to a pivot pin 30 extending therethrough. Upper pivoting movement of the control arm 29 is resisted by a coil spring 32 which has its lower end disposed in an annular groove 29a of a support plate affixed to the lower control arm 29, and its upper end guided about a downwardly projecting cylindrical portion 21b of the frame member 21.

As seen in Figure 1, the bight portion or cross member 29b at the outer end of the lower control arm 29 supports an adjustable assembly 33 which is effective to shift the ball joint 15 longitudinally of the vehicle for effecting caster angle adjustments.

Thus, it is seen that the road wheel is mounted on the upper and lower control arms by means of upper and lower ball joints which accommodate pivotal swinging movement of the control arms, as well as steering movement of the knuckle 12. It is also evident that if the effective length of the upper control arm 16 is shortened or lengthened, the steering knuckle 12, and consequently the wheel, will pivot about the lower ball joint 15 inclining the upper part of the wheel inwardly or outwardly with respect to the vertical. In the present invention, this adjustment to the effective length of the upper control arm is made through the adjuster mechanism 24, thus providing means for regulating the camber angle.

Also, it will be readily seen that if the lower ball joint 15 is displaced longitudinally of the vehicle, either toward the front or the rear thereof, the axis of the steering knuckle 12 which determines the steering axis of the wheel, will pivot forwardly or backwardly about the upper ball joint 14. This pivoting of the steering axis of the wheel about the upper ball joint is effective to make adjustments to the caster angle and is carried out in this invention by means of the assembly 33.

*Camber assembly*

As best seen in Figure 3, the adjustment assembly 24 disposed at the cross part or bight 16c of the U-shaped control arm 16 includes a sleeve 36 which is externally threaded for engagement in a threaded bore 35 of the arm 16. The sleeve 36 has a hexagonal nut end portion 37, a central tapered bore 38 and a slot 39 extending along one side for the entire length of the sleeve. The ball joint 14 may suitably comprise a ball stud 40, a bearing ring 41 and a housing 42 with an integral arm 43 extending to the side of the joint. The arm 43 includes a tapered shank 45 disposed in the tapered bore 38 of the split sleeve 36 and a threaded end portion 47 of reduced diameter. A nut 49 and a lock washer 50 are disposed on the threaded end of the arm 43.

It will be readily seen, in Figure 3, that, as the nut 49 is threaded onto the end portion 47 of the arm 43, it tends to push the sleeve 36 to the right while drawing the arm 43 toward the left. Since these two members are in tapered engagement this action of the nut 49 will cause the tapered shank 45 of the arm 43 to be wedgingly engaged in the sleeve 36. Since the sleeve 36 has a slotted portion 39 extending along the length thereof the sleeve will tend to expand and become locked in the threaded portion of the bight 16c of the control arm 16. Thus there is provided in this invention a means for locking the arm 43 which extends from the housing of the ball joint in locked engagement relative to the control arm 16.

To vary the effective length of the control arm 16, it is necessary only to back the nut 49 off of the threaded end 47 of the arm 43 and then to tap the end of the arm to disengage the tapered wedge surfaces of the arm and the sleeve. The sleeve 36 may then be threaded into or out of the control arm as desired. When the necessary desired adjustment has been made the arm 43 may be once more inserted in the sleeve and locked into position by means of the nut 49.

In Figure 7, a diagrammatic sketch of the camber angle adjustment is illustrated. The line A is a vertical line, and, in the wheel illustrated, it passes through the center of the tire on the wheel. Thus, there is no camber angle in this illustration. The line B illustrates how the wheel can be pivoted to the right about the lower ball joint 15 by increasing the effective length of the upper control arm 16, thus providing a positive camber angle. The line C illustrates the effect obtained by shortening the effective length of the upper control arm 16 and causing the wheel to pivot in the opposite direction to provide negative camber.

Thus, there is provided in this invention a simple, efficient screw-type adjustment member by means of which the camber angle of the steering wheel can be quickly and accurately adjusted.

Caster adjustment

Referring to Figures 5 and 6, the adjuster assembly 33 comprises a sleeve 55 which is externally threaded for engagement in a threaded bore 56 of the bight portion 29b of the control arm 29. The sleeve has a hexagonal nut end portion 58, a tapered bore 59 disposed eccentrically of the axis of the sleeve and a slot 60 extending along the entire length of the sleeve. The ball joint 15 includes a stud 27 and a housing 62 with an integral arm 63. The arm 63 includes a tapered shank 64 disposed in the tapered bore 59 of the sleeve 55 and a threaded end portion 66 of reduced diameter. A nut 67 and a lock washer 68 are disposed on the end portion 66 for drawing the tapered shank 64 into wedging, locked engagement in the sleeve 55.

Caster adjustments are made by loosening the nut 67 and disengaging the tapered surfaces so that the sleeve 55 may be freely threaded in the control arm 29b. In Figure 6 the letter A indicates the distance between the center B of the arm 63 and the center C of the sleeve 55. It will readily be seen that, if the sleeve 55 is rotated 180°, the center C of the arm 63 will move to position B' and be displaced a distance equal to twice the distance A between the original centers. Thus, the arm 63 will be shifted longitudinally of the vehicle a distance equal to A.

Referring to Figure 8, it is seen that when the arm 63 and the ball joint 15 are shifted longitudinally of the vehicle from B to B' the caster angle of the wheel is changed due to the pivoting action of the mounting about point P which represents the upper ball joint 14.

From the foregoing description it is seen that there is provided by this invention simple and efficient means for varying the camber and caster angles of a front wheel of an automotive vehicle. There is also disclosed in this invention means for wedgingly engaging the adjustment mechanism in locked position to effectively maintain the camber and caster adjustments.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an adjustable wheel suspension including a control arm having a threaded aperture, a steering knuckle supported by the control arm, and a ball joint connecting the steering knuckle with the control arm, the improvement for adjusting the effective length of said control arm to alter the camber of the steering knuckle which comprises a solid tapered adjusting arm connected to the housing of said joint an externally threaded split sleeve member adjustably threaded in the threaded aperture in said control arm and having a coaxial tapered bore receiving said adjusting arm, and means for drawing said adjusting arm into said bore and thereby expanding the sleeve to move the threads on the sleeve into wedging engagement with the threads in the aperture to lock said sleeve in said aperture in a selected position and to lock said adjusting arm in said bore.

2. In an adjustable wheel suspension having a control arm, a steering knuckle supported by the control arm, and a ball joint connecting the steering knuckle with the control arm, the improvement in camber adjustment which comprises means for adjusting the effective length of said control arm to adjust the position of the steering knuckle, said means comprising a solid tapered adjusting arm connected to the housing of said joint, a threaded aperture in said control arm, an externally threaded split sleeve member adjustably disposed in said aperture and having a coaxial tapered bore receiving and cooperating with said arm and means cooperating with said adjusting arm and said sleeve for drawing said adjusting arm into said tapered bore for expanding the threads on said sleeve into wedging engagement with the threads in the aperture and to wedge the adjusting arm into locked engagement with the sleeve.

3. In an adjustable wheel suspension including a control arm having a threaded aperture therein, a steering knuckle carried by the control arm, and a joint connecting the steering knuckle with the control arm, the improvement in adjusting the caster which comprises means for providing fore and aft movement of said joint to displace the steering knuckle, said means comprising a tapered adjusting arm connected to the housing of said joint, a split sleeve threaded in said threaded aperture and having an eccentric tapered bore receiving said adjusting arm and means for drawing said adjusting arm into said bore and thereby expanding the sleeve to move the threads on the sleeve into binding gripping engagement with the threads in the aperture to lock said sleeve in said aperture in a selected position and simultaneously to lock said adjusting arm in said bore.

4. In an adjustable wheel suspension including a control arm having a threaded aperture therein, a steering knuckle carried by the control arm, and a ball joint connecting the steering knuckle with the control arm, the improvement which comprises means for displacing the steering knuckle axis for adjusting the caster angle, said means comprising a tapered adjusting arm integrally formed with the housing of said ball joint and having a threaded end portion, a sleeve split along one side and threaded into said control arm and having an eccentrically positioned tapered bore receiving said adjusting arm, and a nut threaded on the end of said adjusting arm and reacting upon the sleeve to urge said tapered surfaces into binding engagement and to cause said split sleeve to expand thereby wedging its external threads into binding engagement with the threads of said control arm to wedgingly lock the adjusting arm relative to the control arm.

JAMES H. BOOTH.

References Cited in the file of this patent

UNITED STATES PATENTS

| Number | Name | Date |
|---|---|---|
| 795,467 | Wessinger | July 25, 1905 |
| 2,085,738 | Coleman | July 6, 1937 |
| 2,115,919 | Slack | May 3, 1938 |
| 2,123,087 | Leighton | July 5, 1938 |
| 2,123,088 | Leighton | July 5, 1938 |
| 2,173,973 | Leighton | Sept. 26, 1939 |
| 2,210,790 | Bernhard | Aug. 6, 1940 |
| 2,238,879 | Dauben | Apr. 22, 1941 |
| 2,290,923 | Wahlberg | July 28, 1942 |
| 2,405,458 | Slack et al. | Aug. 6, 1946 |
| 2,544,331 | Kogstrom | Mar. 6, 1951 |
| 2,605,118 | Booth et al. | July 29, 1952 |

FOREIGN PATENTS

| Number | Country | Date |
|---|---|---|
| 110,573 | Switzerland | July 1, 1925 |
| 286,424 | Great Britain | Mar. 8, 1928 |
| 603,199 | Great Britain | June 10, 1948 |